(12) United States Patent
Hofman (10) Patent No.: US 11,702,827 B2
(45) Date of Patent: Jul. 18, 2023

(54) HANDHELD SHOWERHEAD WITH BALL JOINT MOUNT

(71) Applicant: ETL, LLC, Sparks, NV (US)

(72) Inventor: David Hofman, Reno, NV (US)

(73) Assignee: ETL, LLC, Sparks, NV (US)

( * ) Notice: Subject to any disclaimer, the term of this patent is extended or adjusted under 35 U.S.C. 154(b) by 104 days.

(21) Appl. No.: 17/204,125

(22) Filed: Mar. 17, 2021

(65) Prior Publication Data

US 2022/0298766 A1    Sep. 22, 2022

(51) Int. Cl.
| | | |
|---|---|---|
| *E03C 1/06* | (2006.01) | |
| *B05B 15/654* | (2018.01) | |
| *B05B 1/18* | (2006.01) | |
| *F16L 27/04* | (2006.01) | |

(52) U.S. Cl.
CPC ............... *E03C 1/06* (2013.01); *B05B 1/18* (2013.01); *B05B 15/654* (2018.02); *F16L 27/04* (2013.01)

(58) Field of Classification Search
CPC . E03C 1/06; B05B 1/18; B05B 15/654; F16L 27/04
See application file for complete search history.

(56) References Cited

U.S. PATENT DOCUMENTS

| | | | | |
|---|---|---|---|---|
| 6,446,278 B1 * | 9/2002 | Lin | ........................... | E03C 1/06 |
| | | | | 4/615 |
| D626,197 S | 10/2010 | Gilbert | | |
| 7,993,070 B2 | 8/2011 | Kull et al. | | |
| 3,132,745 A1 | 3/2012 | Leber et al. | | |
| 9,687,860 B2 | 6/2017 | Huffington et al. | | |
| 9,919,331 B2 | 3/2018 | Scheffer et al. | | |
| 10,533,309 B2 | 1/2020 | Genord et al. | | |
| 11,247,223 B2 * | 2/2022 | Huang | ..................... | B05B 15/68 |
| 2019/0176170 A1 | 6/2019 | Lee et al. | | |
| 2019/0351444 A1 * | 11/2019 | Berlovan, Jr. | ............ | B05B 1/18 |

FOREIGN PATENT DOCUMENTS

| | | |
|---|---|---|
| CN | 10607667 | 3/2019 |
| GB | 2417756 | 3/2006 |

* cited by examiner

*Primary Examiner* — Qingzhang Zhou
(74) *Attorney, Agent, or Firm* — David Duckworth; One LLP (57) ABSTRACT

An improved showerhead assembly is provided for use with handheld showerheads. The handheld showerhead includes an elongate handle having a rear side with a cavity, and a front face including one or more nozzles for spraying water. In addition, the showerhead assembly includes a mount for affixing to the male threaded pipe found in a shower stall. The mount includes a ball which engages with the cavity so as to allow rotatable and secure attachment of the handheld showerhead to the mount. The ball may include a preliminary alignment chamber and a locking chamber, and the cavity may include a tension pin which projects into both of these chambers so as to provide further support for installation of the handheld showerhead to the mount. In addition, a spring-button tab mechanism may be utilized for managing the engagement and disengagement of the ball with the cavity.

7 Claims, 7 Drawing Sheets

HANDHELD SHOWERHEAD WITH BALL JOINT MOUNT

BACKGROUND OF THE INVENTION

The present invention is showerheads. More particularly, the present invention relates to handheld showerheads incorporating a detachable ball joint mount.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central channel connected to one or more spray nozzles directed to produce a constant pattern. Multi-function spray heads are able to deliver water in different spray patterns such as a fine spray, a coarse spray, a pulsating spray, or even a flood pattern producing a high fluid flow.

A handheld showerhead assembly typically includes a hollow handle connected to a water supply by a flexible rubber hose. The handle has a proximal end which typically has a threaded inlet for connecting to the rubber hose. Meanwhile, at the handle's distal end, the showerhead assembly includes a showerhead including a plurality of nozzles for ejecting water. Typically, the handle and showerhead face are angled relative to one another so that water is ejected at approximately 90 degrees relative to the handle's longitudinal axis.

Advantageously, the showerhead handle allows users to manipulate the spray nozzles into various positions and alignment to assist in the cleaning process. Unfortunately, though handheld showerheads provide many advantages compared to their fixed showerhead counterpart, handheld showerheads suffer from several disadvantages. For example, U.S. Pat. No. 9,919,331 and Chinese Patent No. 106076677 describe handheld showerhead assemblies that utilize a magnet attachment mechanism. In these embodiments, the magnet retention mechanism may be unsecure, causing the handheld showerhead to inadvertently release from its desired attached position.

Additionally, many showerhead assemblies include handheld showerheads which insert or slide into a given slot or bracket. Examples of such constructions are disclosed in U.S. Pat. Nos. 7,966,677, 7,665,676 and U.S. Patent Application Publication No. 2019/0176170. However, none of these embodiments disclose a handheld assembly that utilizes a rotatable, ball joint attachment mechanism.

Many of these embodiments disclose a handheld showerhead assembly that is fixed in its mount position. Thus, it would be advantageous to provide a showerhead assembly that included a firm fastener which would allow the user to manipulate or change the angle of the handheld showerhead.

Traditionally, handheld showerhead assemblies attach to the arm mount using the hose connection. Unfortunately, this elevates the positioning of the showerhead and could be problematic for users with short height, low ceilings, or high shower arms. Thus, it would be further advantageous to provide a showerhead assembly that connected to the arm mount at a lower position on the back of the handheld showerhead.

SUMMARY OF THE INVENTION

The present invention addresses the aforementioned disadvantages by providing an improved handheld showerhead assembly which includes a mounting structure for supporting a handheld showerhead through a ball joint. The showerhead assembly includes a handheld showerhead including a primary showerhead having a plurality of nozzles for expelling water such as within a shower. Additionally, the primary showerhead comprises a rear side which includes a substantially spherical cavity. A "substantially spherical cavity" is defined as having a substantial portion of its body have a spherical or curved shape. However, "substantially spherical cavity" is intended to be interpreted broadly such that the entire cavity need not have concave surface. For example, the substantially spherical cavity may include a portion of the surface that is planar such as to form a frusto-spherical shape.

The handheld showerhead further includes a hollow handle with a proximal end which preferably is threaded for connecting to a flexible hose. The handle is elongate so as to define a longitudinal axis, and preferably, the distal end of the handle affixes to the showerhead at an angle, such as 45° to 90°. Additionally, the handheld showerhead includes a channel having an inlet for receiving water for being expelled from the showerhead nozzles. Various channel, conduit and nozzle constructions can be determined by those skilled in the art for diverting water from the inlet to the showerhead's nozzles.

Moreover, the showerhead assembly of the present invention further possesses a mounting structure for releasably holding the hollow handle. Specifically, the mounting structure comprises a housing which includes a ball sized and configured to releasably engage within the showerhead's cavity. Even more specifically, the showerhead's substantially spherical cavity defines a space sized and configured to be complementary to the mounting structure's ball so as to form a ball joint construction. In a preferred construction, the ball within the cavity provides a press-fit attachment of the elements therebetween. Upon installation of the showerhead cavity to the ball, the handheld showerhead is thereby removably and rotatably docked onto the mount.

Further, the mount has an inlet which preferably is threaded for connecting to a water supply such as a male threaded pipe projecting from a shower wall. Preferably, the mount's housing is affixed to the inlet by ball and socket attachment so as to allow rotation about a central axis. The housing has a central conduit that delivers water to a hose outlet and ultimately, the showerhead nozzles.

In the preferred embodiment, the showerhead's cavity has a frusto-spherical shape and includes a planar surface and a tension pin which axially protrudes from the cavity's planar surface. The tension pin is sized and configured to engage with the mounting structure's ball when the ball is positioned within the showerhead's cavity. Specifically, the ball has a distal end comprising a preliminary alignment chamber which houses a locking chamber axially aligned therein. Even more specifically, the tension pin engages with the ball's locking chamber so as to prevent over-rotation of the ball joint or inadvertent release of the showerhead handle. Additionally, the tension pin engages with the ball's preliminary alignment chamber to further stabilize and secure the connection realized between the showerhead handle and the mounting structure. Additional or alternative ball joint assemblies for providing these capabilities can be selected by those skilled in the art.

In another preferred embodiment, the showerhead handle includes a spring-loaded button and tab mechanism wherein the button extends from the backside of the handle and extends from a tab which pivotally moves with respect to the button and spring configuration. Specifically, a spring is disposed within an opening in the handle and compresses and decompresses as a function of the button and tab. Even more specifically, when the button is pressed, the spring is decompressed and the tab extends upwardly so as to protrude into the cavity area and capture the ball received in the cavity. Conversely, when the button is depressed, the spring compresses and the tab pivots downwardly. The tab is positioned and configured so that when it pivots downwardly, it is no longer protruding into the cavity so as to provide an engagement point which allows the ball to release from within the cavity. Various spring-loaded button and tab constructions for providing these capabilities can be selected by those skilled in the art.

Advantageously, the showerhead assembly provides for secure retention of the handheld showerhead onto a mount.

Also advantageously, the showerhead assembly allows the bather to controllably rotate the handheld rotate so as to divert the water stream in a desired location within the shower environment.

Other features and advantages of the present invention will be appreciated by those skilled in the art upon reading the detailed description which follows with reference to the drawings.

DETAILED DESCRIPTION OF THE INVENTION

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all FIGS. 1-9, the showerhead assembly 1 includes a mounting structure 11 for supporting a handheld showerhead 47. The handheld showerhead portion of the showerhead assembly 1 has unique features but like traditional constructions includes a hollow handle 49 having a proximal end 51 which affixes to a flexible hose 41 having a first end 25 and a second end 27, and a distal end which includes a showerhead 53. The handle 49 includes a longitudinal axis, and preferably the showerhead 53 affixes to the distal end of the handle 49 at an angle, such as 45° to 90°, relative to the handle's 49 longitudinal axis. The showerhead assembly's primary showerhead 53 has a front face 55 through which a plurality of nozzles 57 project. As understood by those skilled in the art, water is capable of flowing through a central channel (not shown) within the center of the handle 49 which connects to the showerhead's nozzles 57 which are constructed to spray water. Additionally, and as illustrated in the Figures, the primary showerhead 53 comprises a rear side 99 which defines a substantially spherical cavity 15. A substantially spherical cavity is defined as having a substantial portion of its surface as having a spherical or curved shape, but wherein a portion of the surface may be planar such as to form a frusto-spherical shape. In a preferred embodiment, the cavity 15 is composed of rubber or plastic material. As illustrated in FIGS. 1-7, preferably the handheld showerhead's hollow handle 49 has a proximal end 51 which has male threads so as to couple to the female threads found on the first end 25 of a traditional flexible hose.

The showerhead assembly 1 has a unique hollow mounting structure 11 for releasably holding the showerhead assembly's hollow handle 49. As illustrated in each of the Figures, the mount 11 includes an inlet 13 which connects to a water supply. Preferably, the inlet 13 includes female threads for connecting to the male threads found at the end of a traditional shower stall pipe. Preferably, the mount's hollow housing 19 is connected to the mount's inlet 13 by a ball and socket attachment. As illustrated in the FIGS. 4-7, the ball and socket allow the mount 11 to rotate and swivel in any direction about the ball's center.

As illustrated in FIGS. 1-9, like traditional handheld showerhead mounting structures, the preferred mount 11 includes a housing 19 which has a central conduit and hose conduit which connects the inlet 13 to a primary hose outlet. Preferably, the mount's primary outlet includes male threads for connecting to the female threaded second end 27 of the flexible hose 41. Additionally, as illustrated in FIG. 1-9, the mount housing's front end defines a curved area by which a ball 33 extends therefrom. The ball 33 is sized and configured to releasably engage with the showerhead's cavity 15 and the ball's convex curved area allows the engaged showerhead cavity 15 to rotate or swivel about a central axis. The showerhead's cavity 15 defines a space correspondingly configured for receipt of the ball 33. Upon engagement of the showerhead cavity 15 with the ball 33, the handheld showerhead 47 is thereby removably and rotatably docked onto the mount 11. In a preferred embodiment, the ball 33 is composed of rubber material. In an even more preferred embodiment, the ball 33 is composed rubber and the cavity 15 is composed of rubber so as to create frictional tension therebetween and further stabilize positioning.

Preferably, and as illustrated in FIGS. 3-9, the showerhead cavity 15 includes a tension pin 61 which extends axially from the cavity's planar surface 97. Even more preferably, the tension pin 61 is composed of plastic material. Additionally, the tension pin 61 is sized and configured to engage with corresponding structures that reside on the ball 33 wherein it provides tension therebetween to help maintain the showerhead handle 49 in a desired position. Specifically, the ball 33 has a distal end 77 being planar and comprising a preliminary alignment chamber 63 and a second axially aligned smaller locking chamber 65. Preferably, the preliminary alignment chamber 63 and locking chamber 65 are both spherical in shape. The locking chamber 65 is sized and positioned to engage with the tension pin 61, wherein the engagement of the tension pin 61 with the locking chamber 65 prevents over-rotation of the ball 33 or inadvertent release of the showerhead handle 49. Moreover, the preliminary alignment chamber 63 is sized and positioned for receipt of the tension pin 61. The engagement of the tension pin 61 with the preliminary alignment chamber 63 further stabilizes the connection realized between the showerhead handle 49 and the mounting structure 11 and secures the ball 33 in place so as to prevent it from popping out of the cavity 15.

In another preferred embodiment, the showerhead handle 49 further comprises a spring-loaded button 88 and tab 87 mechanism. Preferably, and as best illustrated in FIGS. 4-7, the button 88 extends from the handle 49. Specifically, the button 88 is coupled with and fits on the tab 87 which is connected to the handle's rear side 99. Even more specifically, the tab 87 pivotally moves in an upward and downward trajectory and situated directly adjacent to and underneath the cavity 15. Additionally, the spring 89 is disposed within an opening 111 in the handle 49 and is arranged so as to reside between the button 88/tab 87 and the handle 49. Furthermore, the spring 89 is configured so as to compress and decompress as a function of the button 88 and tab 87 mechanism. Moreover, the tab's 87 pivotal movement is dependent on and controlled by the button 88 and thereby, the state of compression of the spring 89.

Figures 1, 2:
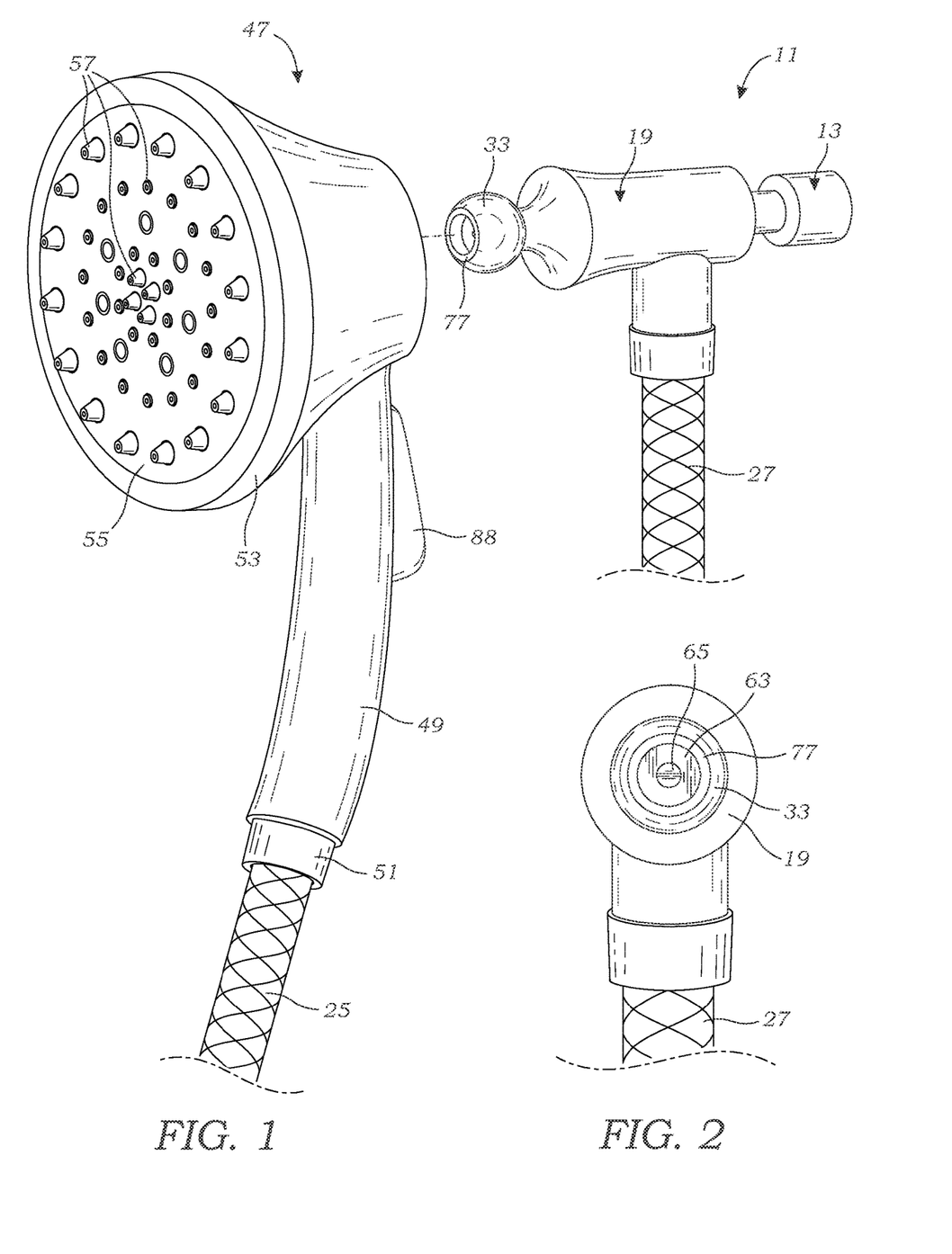
FIG. 1 is a front partially exploded perspective view of the handheld showerhead assembly having a ball mounting structure.
FIG. 2 is a front view of the showerhead mount illustrating the mount's housing comprising the ball which includes a preliminary alignment chamber having a locking chamber.
Figure 3:
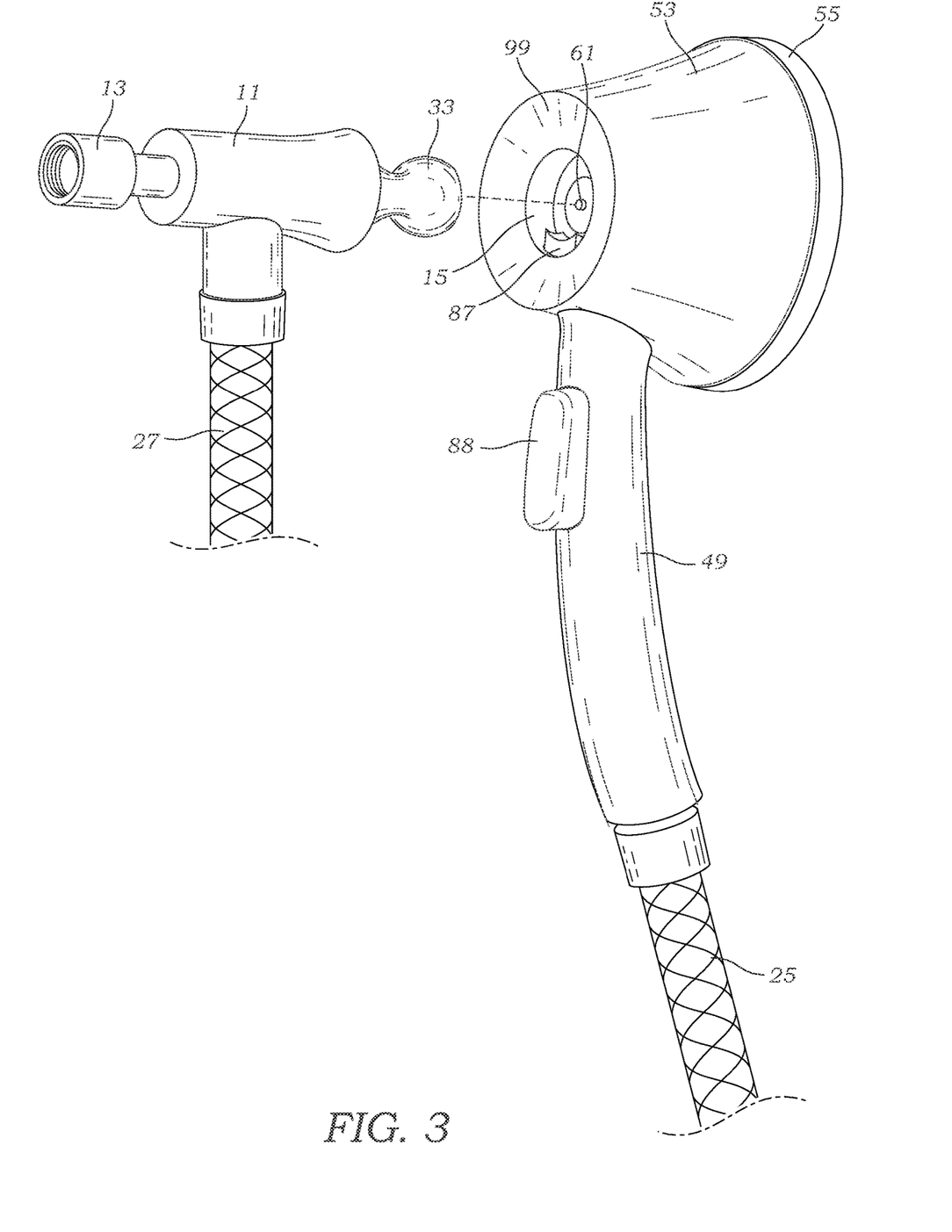
FIG. 3 is a rear partially exploded perspective view of the handheld showerhead assembly of FIG. 1 illustrating the showerhead's cavity having a tension pin whereby the ball on the mounting structure attaches.
Figure 4:
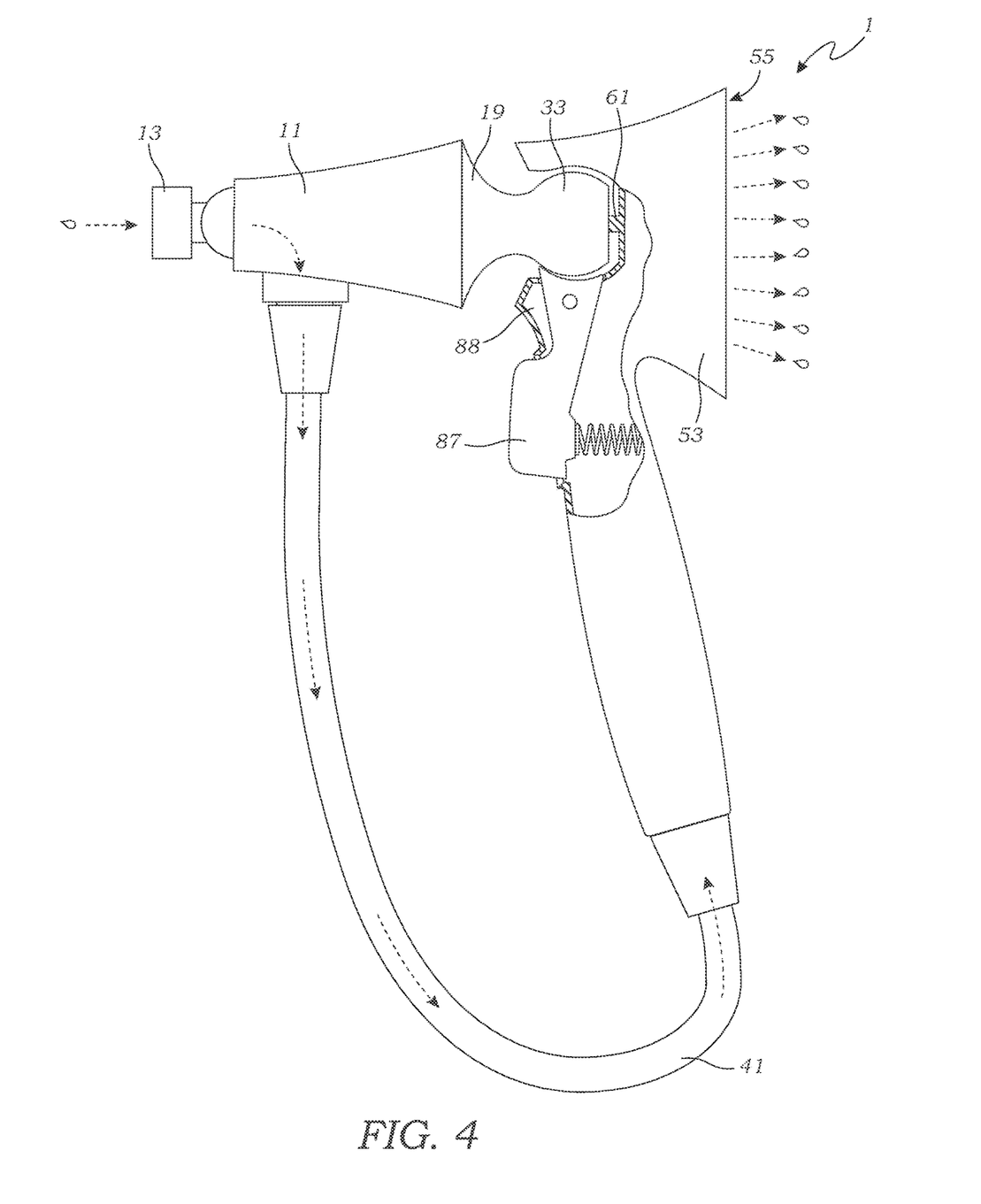
FIG. 4 is a left side partially cutaway view of the handheld showerhead assembly illustrating water expelling through the showerhead nozzles, and wherein the ball is attached to the cavity by its tension pin and the handheld showerhead includes a spring-button tab mechanism.
Figure 5:
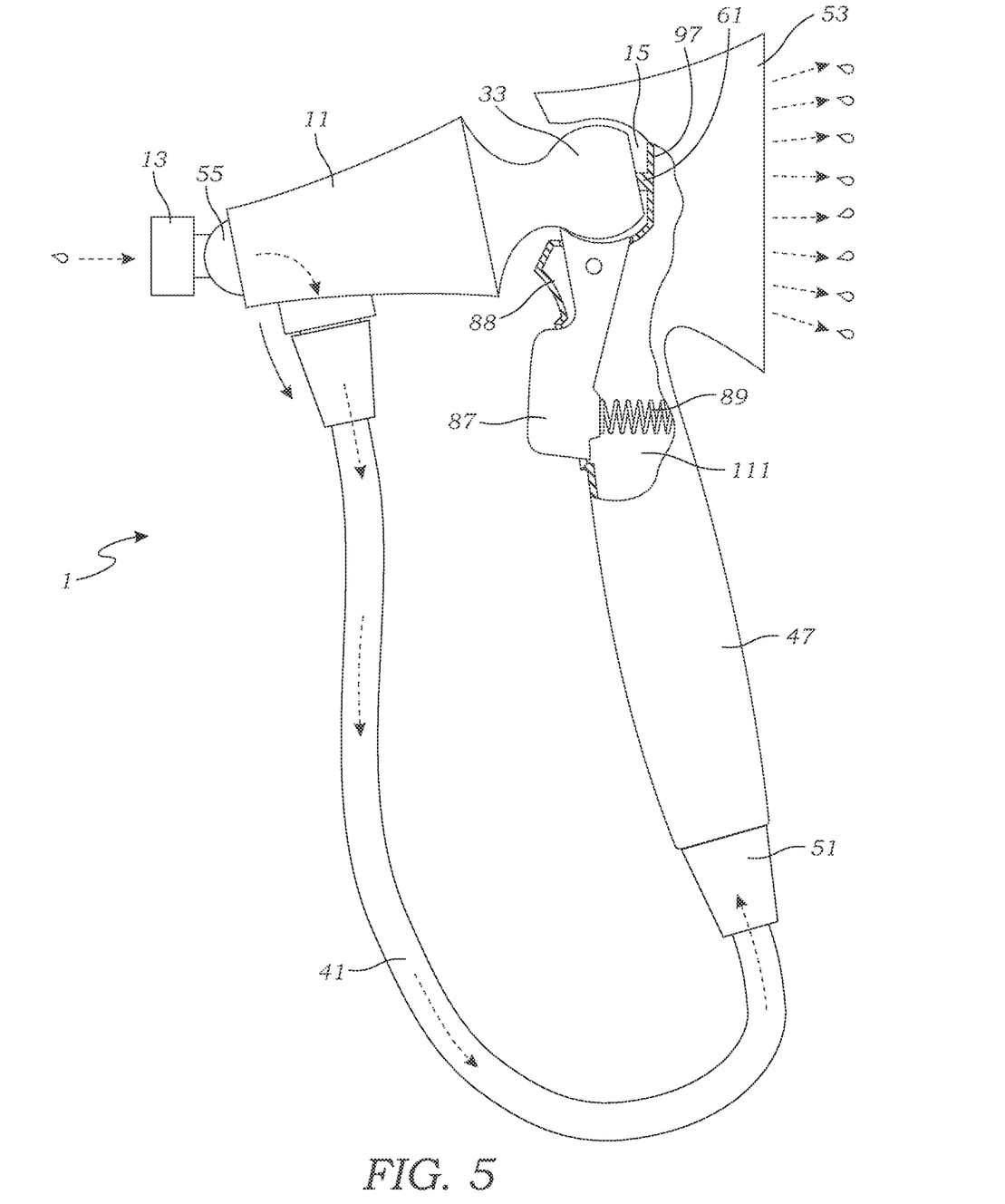
FIG. 5 is a left side partially cutaway view of the handheld showerhead assembly of FIG. 4 illustrating the mounting structure is in an upwardly rotated position, wherein the ball is attached to the cavity by its tension pin and the spring button tab mechanism's spring is in a decompressed state.
Figure 6:
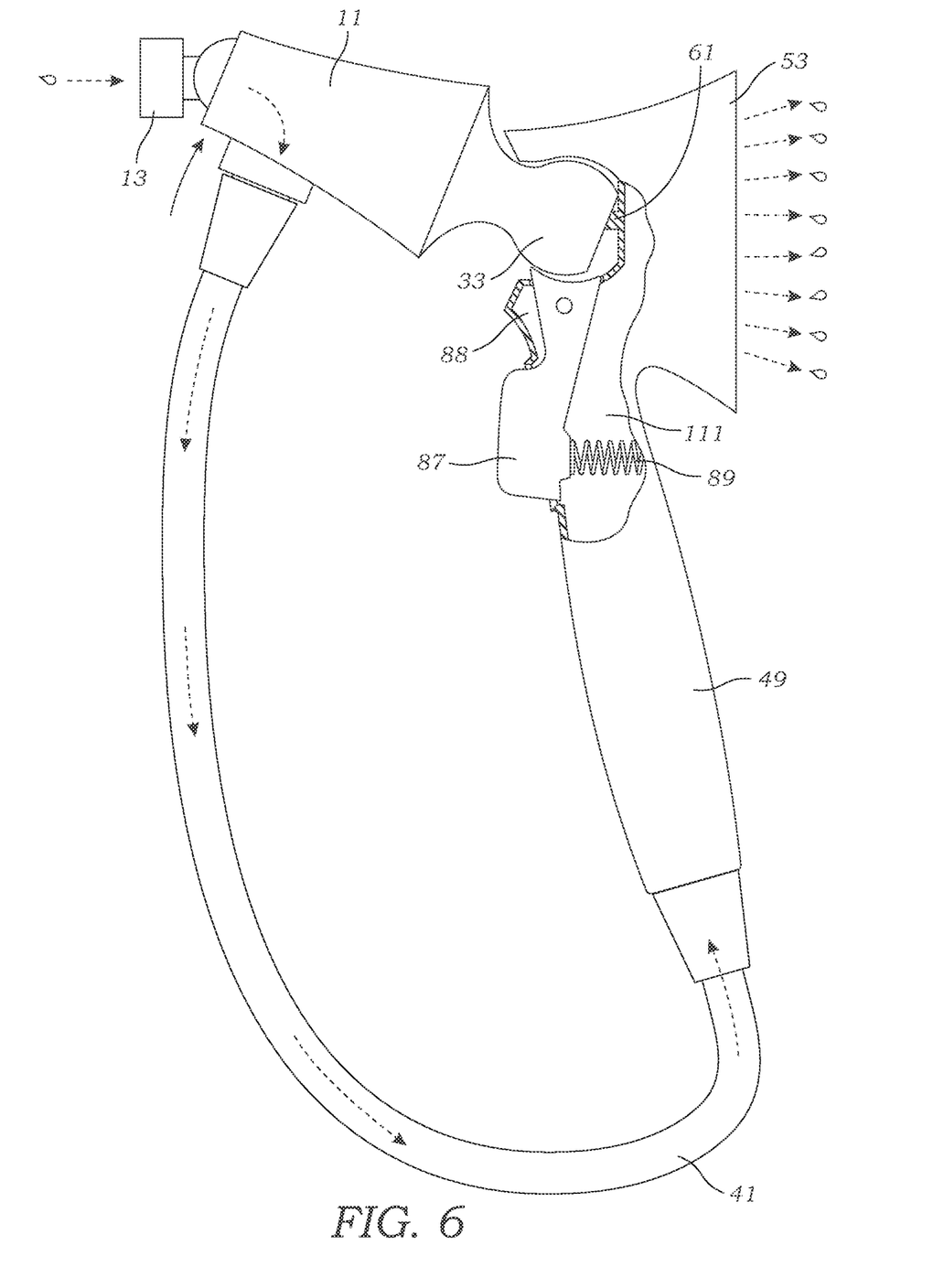
FIG. 6 is a left side partially cutaway view of the handheld showerhead assembly of FIG. 4 illustrating the mounting structure in a downwardly rotated position, wherein the ball is attached to the cavity by its tension pin and the spring button tab mechanism's spring is in a decompressed state.
Figure 7:
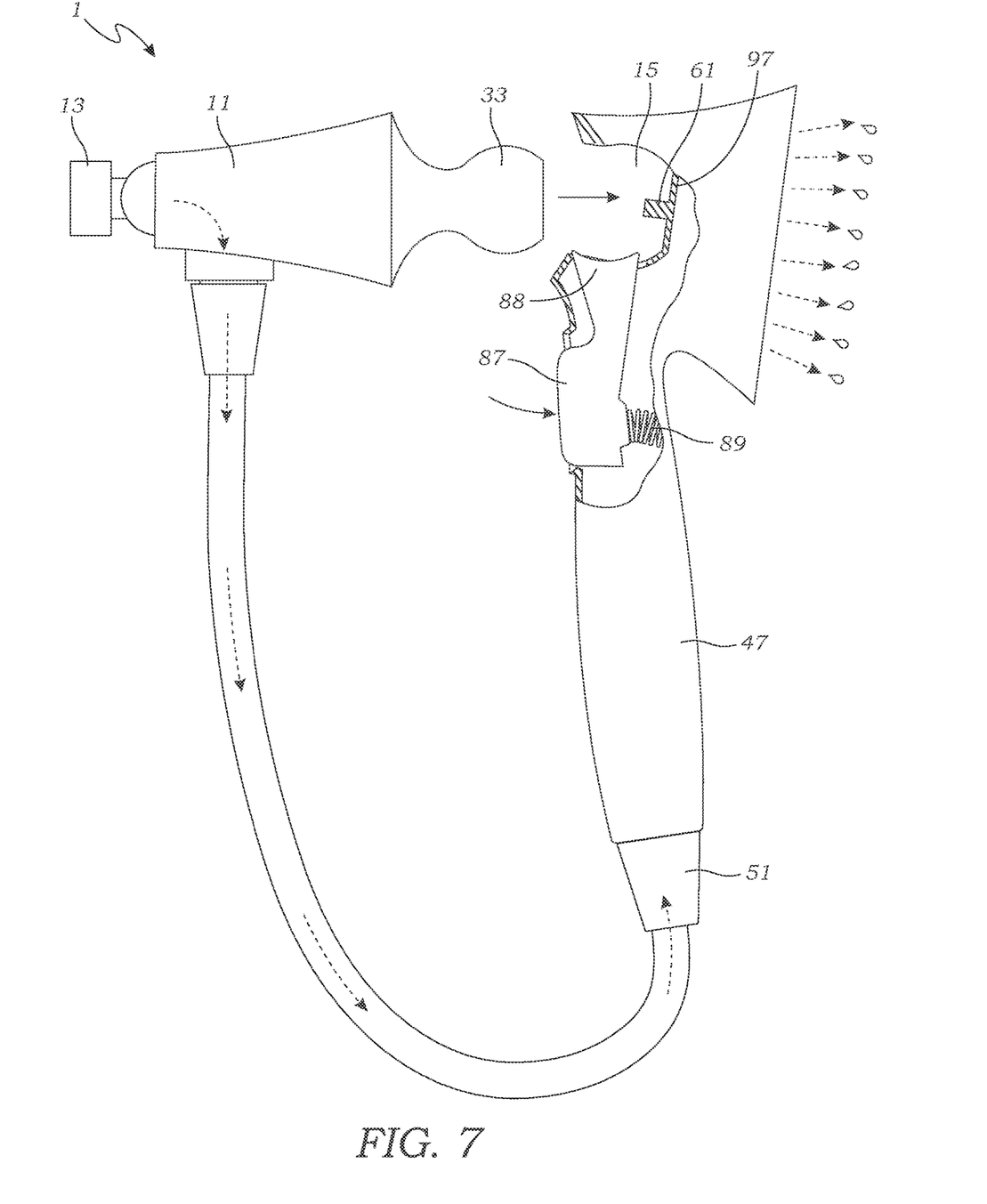
FIG. 7 is a left side partially exploded cutaway view of the handheld showerhead assembly illustrated in FIG. 4 wherein the spring is in its compressed state and the ball is released from its engagement with the cavity.
Figure 8:
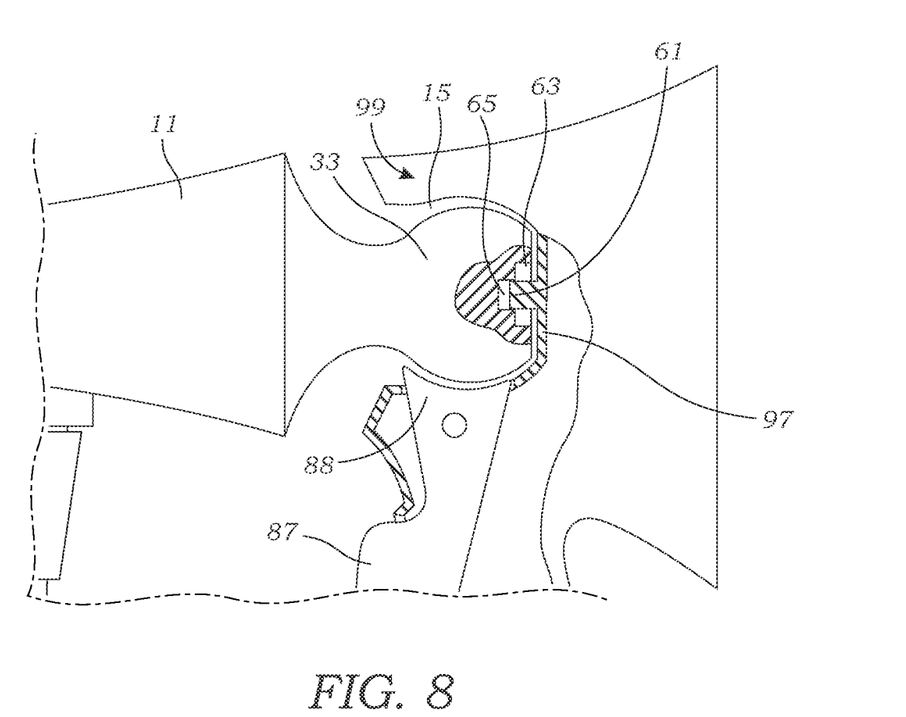
FIG. 8 is a left side partially cutaway view of the handheld showerhead cavity's tension pin engaged with the mount's ball through its locking chamber and preliminary alignment.
Figure 9:
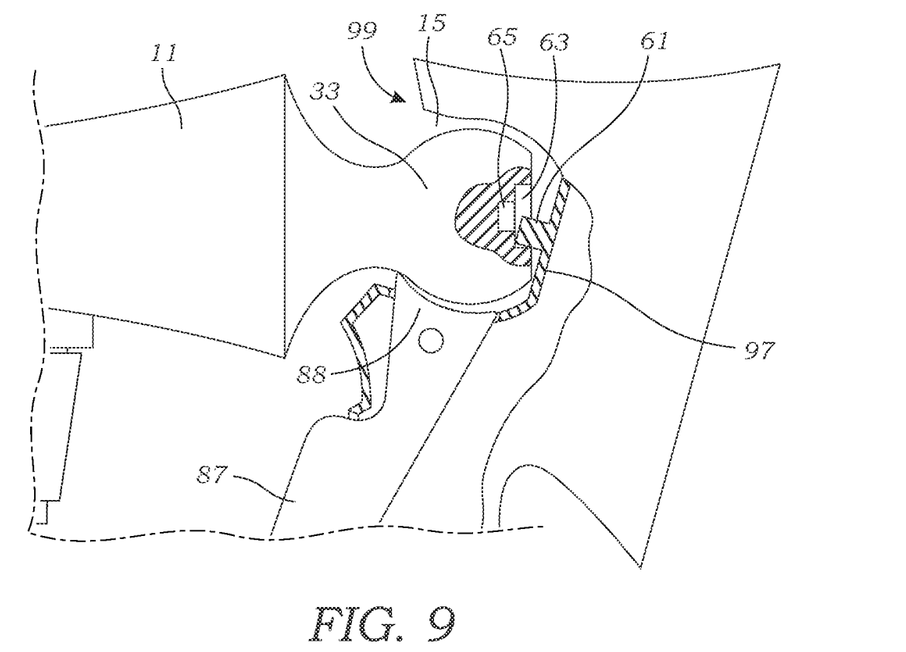
FIG. 9 is a left side partially cutaway view of the handheld showerhead and mount illustrated in FIG. 8 wherein the tension pin is engaged with the preliminary alignment chamber but not fully engaged with the locking chamber.

Specifically, when the button 88 is not pressed, the spring 89 remains in a decompressed state and the tab 87 extends upwards so as to encapsulate the ball 33 received in the cavity 15 and thereby provide integral support for the connection experienced therebetween. Conversely, upon depression of the button 88, the spring 89 compresses and the tab 87 pivots downwardly. In this state, the tab 87 is no longer protruding upwards so as to encapsulate and provide support for the ball 33 received in the cavity 15. Various spring-loaded button and tab constructions for providing these capabilities can be selected by those skilled in the art Accordingly, as best illustrated in FIGS. 4-6, once the handheld showerhead 47 is properly engaged with the ball 33, the handheld showerhead 47 is capable of pivoting both upwardly and downwardly, as well as left and right, so as to be able to spray water throughout a shower stall, as desired by the bather.

The present shower assembly provides an improved mounting structure for holding a handheld shower assembly. Advantageously, the mount 11 provides an easy connect docket for the handheld showerhead 47 in which the handheld showerhead 47 is securely positioned. Also advantageously, the ball joint connection allows the bather to orient the handheld showerhead 47 as desired so as to divert the stream of water to different locations within the shower enclosure.

While preferred showerhead assemblies have been illustrated and described, it will be apparent that various modifications can be made without departing from the spirit and scope of the invention. Alternative embodiments may be envisioned by those skilled in the art after consideration of the present disclosure. Accordingly, it will be apparent that various modifications can be made without departing from the spirit and scope of the invention.

Therefore, having described my invention in such terms such as to enable a person skilled in the art to understand the invention, recreate the invention and practice it, and having presently identified the presently preferred embodiments thereof, I claim:

1. A handheld showerhead assembly comprising:
   a handheld showerhead including a primary showerhead and an elongate hollow handle, said primary showerhead having a front face and a plurality of nozzles projecting from said front face, said primary showerhead further having a rear side with a cavity, said elongate hollow handle having a proximal end and a distal end with said distal end affixed to said primary showerhead, said handheld showerhead further including a channel connecting said hollow handle's proximal end to said nozzles for transporting water received from said handle's proximal end to said nozzles;
   a hose having first and second ends with said first end being connected to said elongate handle's proximal end;
   a showerhead mount including a housing, a female threaded inlet, a male threaded outlet which is connected to said hose's second end, and a central conduit connecting said female threaded inlet to said male threaded outlet;
   said housing further including a ball sized and configured to releasably fit within said showerhead's cavity, said cavity is sized so as to define a space configured to complementary receive said ball, and said handheld showerhead removably and rotatably docked onto said showerhead mount by said ball with said cavity;
   wherein said ball has a distal end being planar and including a locking chamber, and said cavity includes a tension pin which axially protrudes from said cavity's planar surface to project into said locking chamber when said ball is positioned within said cavity; and
   wherein said ball's distal end includes a preliminary alignment chamber which is axially aligned with said locking chamber, said preliminary alignment chamber being larger than said locking chamber for preliminary alignment and receipt of said tension pin.

2. The handheld showerhead assembly of claim 1, wherein engagement of said locking chamber with said tension pin is configured to prevent over-rotation or inadvertent release of said ball, and whereby installation of said handheld showerhead to said showerhead mount is further stabilized and secured when said tension pin is received by said locking chamber.

3. The handheld showerhead assembly of claim 1 wherein said showerhead handle further includes a spring, a button, and a tab, said button extends from said handle, said spring is disposed within an opening in said handle and arranged between said button and said handle, said spring is configured so that spring compresses upon depression of said button and said spring decompresses when said button is not depressed, said tab is coupled with and fits said button to realized pivotal movement that is dependent upon depression of said button and compression of said spring, and said tab is positioned directly adjacent to and underneath said cavity so as to protrude into said cavity when in upward configuration.

4. The handheld showerhead assembly of claim 3 wherein when said button is not depressed, said spring is in decompressed state and said tab is protruding upwardly so as to capture said ball received in said cavity.

5. The handheld showerhead assembly of claim 3 wherein when said button is depressed, said spring is compressed and said tab pivots to a position whereby it does not fully capture said ball.

6. The handheld showerhead assembly of claim 1 wherein said hollow handle extends longitudinally to define a longitudinal axis, and said showerhead's front face faces at an angle between 45° and 90° relative to said handle's longitudinal axis.

7. The handheld showerhead assembly of claim 1 wherein said showerhead mount's housing is connected to said female threaded inlet through a ball and socket attachment configured to allow rotational movement of said showerhead mount relative to said ball and socket ball's center.

\* \* \* \* \*